INVENTOR
ROBERT G. LOVE
PAUL LORENZINO, JR.

INVENTOR
ROBERT G. LOVE
PAUL LORENZINO, JR.

BY
Burns Doane Benedict Swecker & Mathis
ATTORNEYS

INVENTOR
ROBERT G. LOVE
PAUL LORENZINO, JR.

BY
Burns Doane Benedict Swecker & Mathis
ATTORNEYS

United States Patent Office

3,523,245
Patented Aug. 4, 1970

3,523,245
FLUID MONITORING CAPACITANCE PROBE HAVING THE ELECTRIC CIRCUITRY MOUNTED WITHIN THE PROBE
Robert G. Love and Paul Lorenzino, Jr., Duncan, Okla., assignors to Halliburton Company, Duncan, Okla., a corporation of Delaware
Filed Apr. 4, 1968, Ser. No. 718,694
Int. Cl. G01r 27/26; H01g 7/00
U.S. Cl. 324—61      15 Claims

ABSTRACT OF THE DISCLOSURE

A highly accurate capacitance probe and oscillator circuit assembly for providing a variable frequency output signal representative of a condition of the fluid being sensed. The capacitance probe and oscillator circuit assembly is especially adapted to be used with an analyzing system which requires a highly accurate frequency signal input to determine the net oil flowing from a particular oil field installation. Specifically, the capacitance probe and oscillator circuit assembly includes a body member having a fluid flow channel defining conduit, an oscillator circuit mounting base, and an opening from the mounting base into the fluid flow channel. A probe element is rigidly supported in a fixed position within the conduit by a body of substantially rigid insulating material which extends through the opening surrounding an electrical connector between the probe element and an electrical circuit detachably mounted on the mounting base. The body of substantially rigid insulating material rigidly engages the probe element preventing its deflection in any direction and isolates the electrical connector from stresses applied to the probe element by the fluid flow. The probe element is insulated from the fluid in the channel by a heat shrunk plastic tube which surrounds and compressively engages the probe element. This plastic tube extends onto threaded projections extending from shoulders at both ends of the probe element and is sealed by caps which telescope over the tubing on the threaded projections to abut the shoulders.

BACKGROUND OF THE INVENTION

The present invention relates to capacitance probes and more specifically to coaxial type capacitance probes for sensing a condition of the fluid flowing between the coaxial electrodes.

Known coaxial capacitance probes have been used extensively by the oil industry to measure the net oil being produced by specific wells. This measurement is possible due to the significant difference in dielectric constants of water and oil which are the usual constituents of well fluid. These known coaxial type capacitance probes usually include a probe element supported at both ends, such as those disclosed in the Warren et al. Pat. No. 3,006,189, and the Atkisson Pat. No. 3,176,222. Such capacitance probes, however, are disadvantageous in that they require two supports and a separate electric connection either through one of the supports, or otherwise, to the probe element.

A probe element centrally supported by a single support has been suggsted by the Bond Pat. No. 3,025,464. However, the arrangement disclosed does not provide a sufficiently rigid support for the probe element to prevent deflection which introduces error due to changes in the effective capacitance of the probe. Furthermore, the Bond arrangement provides only limited insulation between the outer electrode and the electrical connection from the probe elements, and it subjects the electrical connection to all the stresses applied to the probe element.

In oil well applications, the varying capacitance of the probes have been sensed by bridge circuits or used to vary the output frequency of variable frequency oscillators. The output signals derived are then fed to measuring and/or indicating apparatus. The usual arrangement includes cables connecting the electrodes of the probe to such a bridge circuit or oscillator. The use of such cables, however, requires on site calibration of the measuring and indicating apparatus to account for the added capacitance due to the variable cable length.

Additionally, in oil industry applications where the oil contains brine, the probe element must be insulated from the fluid to insure the accuracy of the probe. Known capacitance probes have provided plastic coatings on the probe element as such insulation. These coatings have been found defective in that they contain numerous pinholes which render the coating porous. Teflon coatings have also been suggested by the prior art as a suitable insulation for probe elements. However, Teflon has an affinity for paraffin which results in paraffin build-up on the probe element in an oil detecting environment which also impairs the accuracy of the probe.

A system which requires a high frequency input signal on the order of a 1000 kHz. as representative of a condition of the fluid to determine the net oil flowing through a conduit is the net oil analyzer being produced by Halliburton Company, Duncan, Okla.

Since a high frequency output signal is required, the above-mentioned problems of rigidity of the probe element, cable length capacitance, and porosity of insulating coating become even greater in their adverse effects on the accuracy of the total system.

OBJECTS AND SUMMARY OF THE INVENTION

In recognition of the need for an improved capacitance probe, it is a general object of the present invention to obviate or minimize the above-mentioned problems.

Specifically, it is an object of the present invention to provide a capacitance probe having a rigidly supported probe element utilizing a single support.

It is another object of the present invention to provide a capacitance probe in which the electrical connection to the probe element is well insulated from the outer electrode.

Still another object of the present invention is to provide a capacitance probe in which the electrical connection to the probe element is isolated from stresses applied by fluid flow.

An additional object of the present invention is to provide a capacitance probe in which the need for cable connections between the probe electrodes and subsequent electric circuitry is eliminated.

It is also an object of the present invention to provide a capacitance probe in which the probe element is tightly sealed by a non-porous insulation.

A further object of the present invention is to provide a capacitance probe of sufficient accuracy to be used effectively with Halliburton Company's net oil analyzer.

These objects are accomplished in accordance with the present invention by a capacitance probe having a fluid flow channel defining conduit with an opening in one side and a probe element positioned in the channel. The probe element is retained in this position by means of an electrical connector extending through the opening. The probe is rigidly supported and electrically isolated from the fluid channel by a body of substantially rigid insulating material surrounding the electrical connector and extending through the opening to rigidly engage the probe elements, thus preventing its deflection in any direction. Furthermore, this body of insulating material isolates the electrical connector from stresses applied to the probe element by the fluid flow.

A variable oscillator circuit is provided on a support member directly mounted on the conduit thereby eliminating the need for a cable connection of variable length. The oscillator circuit is readily accessible and detachably secured to the support member to provide easy replacement and access to the probe support. The probe element is insulated by heat shrunk plastic tubing which is tightly sealed by caps of insulating material threaded to projections extending from the ends of the probe element.

THE DRAWINGS

DETAILED DESCRIPTION OF THE SYSTEM

Figure 1:
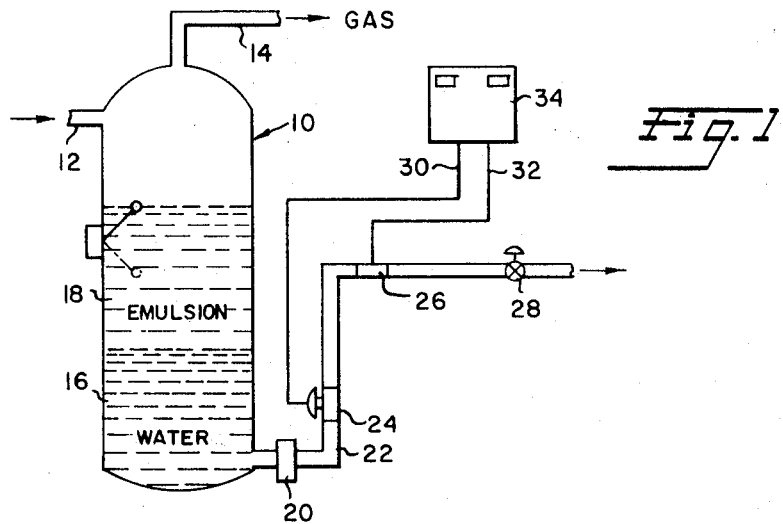
FIG. 1 is a conventional oil field installation incorporating the present invention.

FIG. 1 illustrates an oil field installation which incorporates the present invention. Production oil enters a separator 10 through a conduit 12 disposed in the upper portion of the separator. Gas present in the production fluid is allowed to separate out through a conduit 14 in the top of the separator. The remaining production fluid may contain free water 16 which settles to the bottom of the separator 10 and an emulsion 18 of oil, gas and water which floats on the free water. The fluids from the separator 10 are customarily fed continuously or periodically through a strainer 20 and up through a vertical conduit 22 in which the capacitance probe 24 of the present invention is disposed. Gas breakout from the emulsion 18 which introduces error in the net oil measurements may occur at the flowmeter, elbows, dump valves, and in long runs of a conduit. To minimize this gas breakout, the capacitance probe 24 is located as near as possible to the separator 10. Furthermore, to prevent the entrapment of gas and minimize gravitational separation of the emulsion 18, the capacitance probe is mounted in a vertical section 22 of the conduit.

The fluid then passes through a flowmeter 26 which may be of the turbine type and out through a dump valve 28 to a treater or a production line (not shown).

Output signals from the capacitance probe and the flowmeter are fed through lines 30 and 32, respectively, to a net oil analyzer 34 which may be of the type produced by Halliburton Company, Duncan, Okla.

Figure 2:
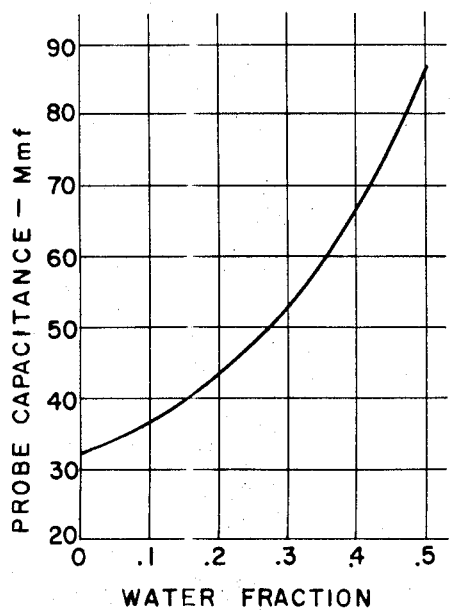
FIG. 2 is a graph illustrating the relationship between probe capacitance and the water fraction of the fluid being sensed.

The capacitance probe 24, hereinafter described in detail, is designed to provide pulses representative of the net oil in the fluid. Basically, it comprises a variable capacitance which controls the frequency of the output signal of an electrical oscillator. Since the dielectric constants of water and oil are substantially different, that of oil being about 2.5 and that of water about 80, changes in capacitance due to the varying dielectric constant of the fluid may be used as an indication of the net oil fraction of the fluid. In a capacitance probe of typical dimensions, as hereinafter described, the variation of capacitance with increasing water fraction is illustrated in the graph of FIG. 2. As can be seen from FIG. 2, the capacitance of the probe varies from a low of about 32 mmf. with total oil to a high of about 88 mmf. at 0.5 water fraction. Capacitance for water fractions above 0.5 are not shown since with such water fractions the water tends to separate out and the capacitance quickly approaches the value at free water.

Figure 3:
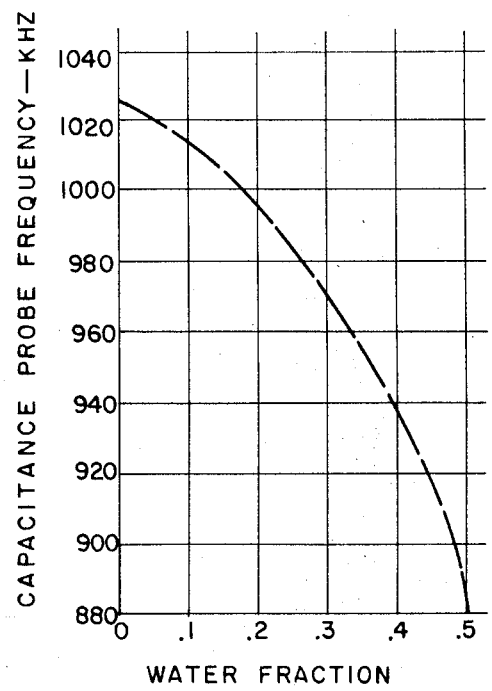
FIG. 3 is a graph illustrating the relationship between the probe output frequency and the water fraction of the fluid being sensed.

As noted above, the varying capacitance is used to modulate the frequency of an oscillator included in the capacitance probe 24. The operating frequency of this oscillator is chosen according to the design requirements of the utilization system. FIG. 3 is a graph of the frequency of the output signal plotted against water fraction of an oscillator chosen in accordance with the requirements of the net oil analyzer of the Halliburton Company, Duncan, Okla. As can be seen from FIG. 3, the output signal frequency varies from about 1030 kHz. with total oil to about 890 kHz. at 0.5 water fraction.

Figure 4:
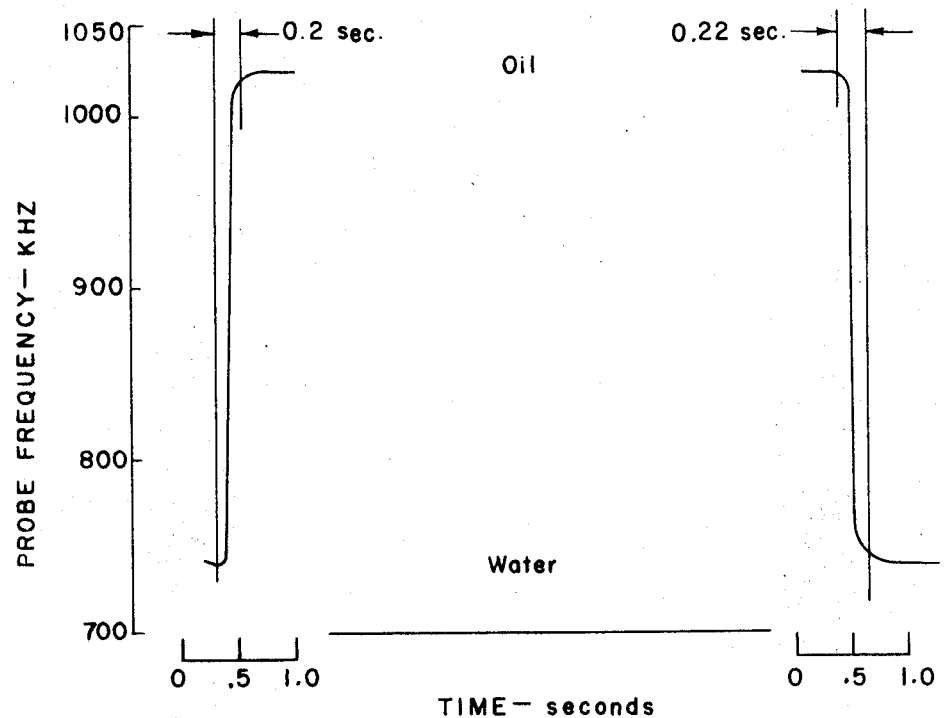
FIG. 4 is a graph illustrating the time response of the capacitance probe to the water-oil interfaces.

From FIG. 1 it may be observed that abrupt changes between free water and oil emulsions will be presented to the capacitance probe. Therefore, for the probe to produce an accurate representation, it must be able to respond quickly to such changes. The response of the capacitance probe hereinafter described is shown by the graph of FIG. 4. As can be seen from FIG. 4, the output signal responds in about 0.2 second to an abrupt change from total water to total oil, or vice versa. In relation to the exemplary sampling rate of the net oil analyzer of Halliburton Company, Duncan, Okla., this time period represents approximately the taking of 50 dielectric samples.

DETAILED DESCRIPTION OF THE CAPACITANCE PROBE

Figure 5:
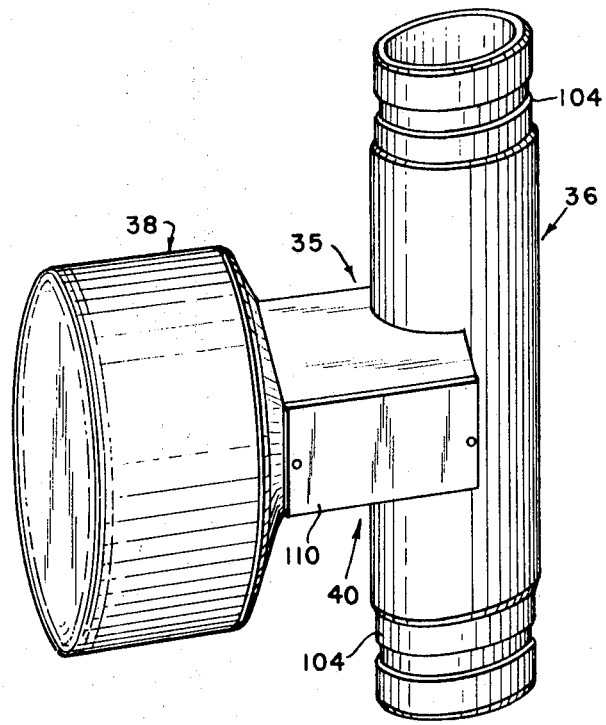
FIG. 5 is a perspective view of a preferred embodiment of the present invention.

Referring to FIG. 5, capacitance probe unit 24 comprises a body 35 having a fluid flow channel defining condiut 36, an oscillator housing portion 38 extending laterally from a central portion of conduit 36, and an external electric terminal panel 40 located on one side of said oscillator housing.

Figure 6:
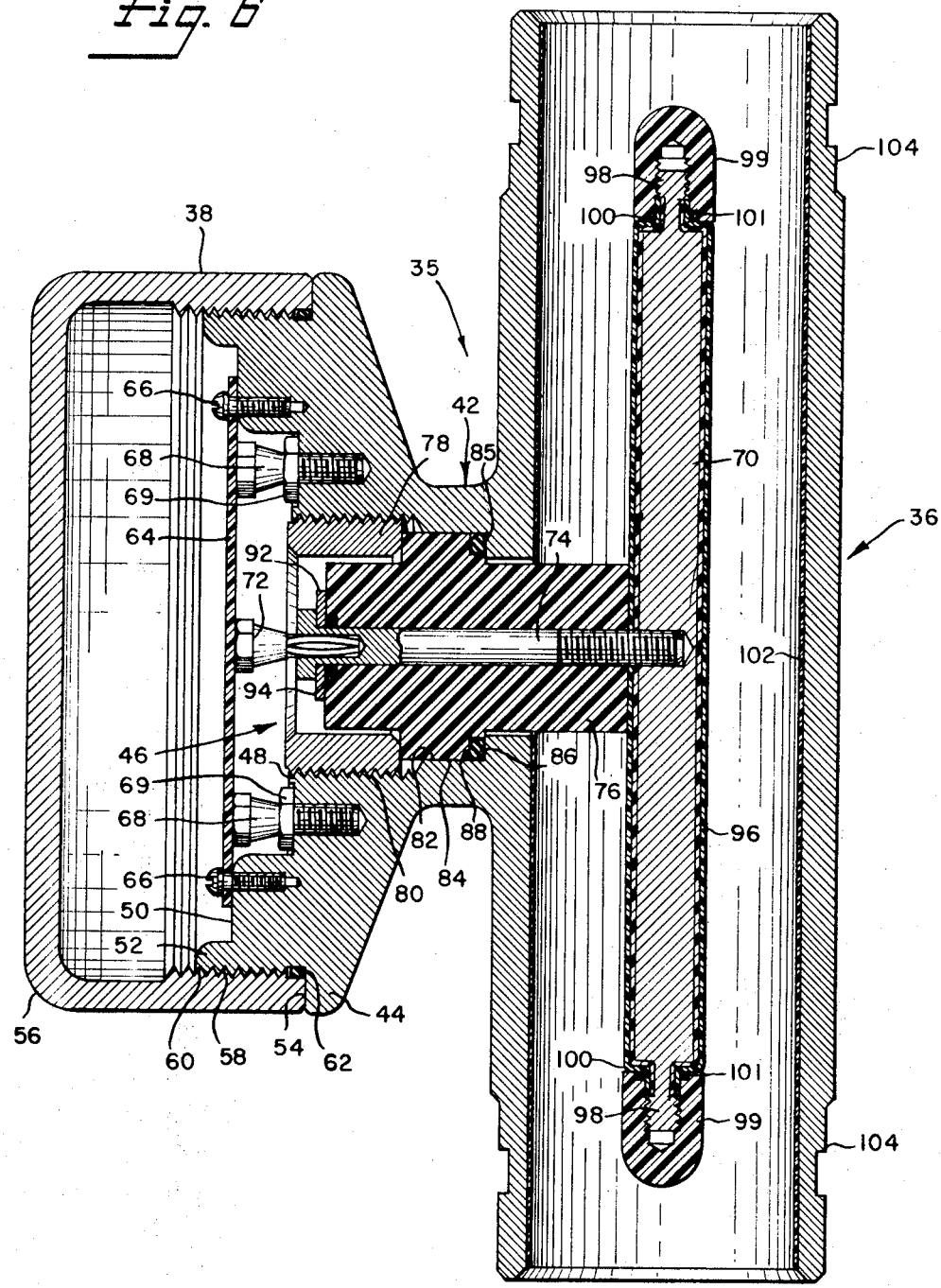
FIG. 6 is a sectional view of the preferred embodiment of the present invention.

With reference to FIG. 6, the body member 35 includes a tubular section which forms the fluid flow channel defining conduit 36 and a cylindrical projection 42 extending at right angles to the axis of the conduit 36 which widens to form an oscillator mounting base 44. The oscillator mounting base 44 has a central opening 46 which has a stepped diameter of decreasing size towards the conduit 36. The oscillator mounting base 44 is stepped radially outward from the opening to provide concentric steps 48, 50, and 52 of increasing distance from the conduit 36. In its exterior, this base provides a step 54 which forms an abutting shoulder for the cover 56. The cover 56 is provided with internal threads 58 which engage the external threads 60 formed in the cylindrical surface of the oscillator mounting base between the steps 52 and 54. A sealing O-ring 62 may be provided in the corner of step 54.

A printed oscillator circuit board 64 may be mounted on step 50 by means of machine screws 66. The oscillator may be any known conventional circuit which produces a variable frequency in response to a changing capacitance and is designed in accordance with utilization requirements. The oscillator is electrically connected to the body member which functions as the outer electrode by means of "banana plugs" 68 which are telescopically mounted into the hollow bolts 69 threaded into the base 44 at step 48. The oscillator is electrically connected to the probe element 70 by a banana plug 72 which is telescopically inserted into a bolt 74. This bolt 74 threadedly engages the probe element 70 and is surrounded by a body 76 of substantially rigid insulating material.

This body 76 is secured in the central opening 46 by an externally threaded, annular nut 78. The nut 78 engages internal threads provided in the larger diameter portion 80 of the central opening 46. The body 76 has an annular flange 82 which is received in the diameter portion 84 of the opening 46 and engages a shoulder 85 provided in the end of this portion 84 nearest the conduit 36.

Nut 78 urges the flange 82 towards the shoulder 85 thereby securing the body 76 in the opening 46 while isolating the electrical connection between the banana plug 72 and the bolt 74 from stresses applied to the probe element by the flow of fluid through the conduit 36.

The flange 82 has a notch 88 to accommodate an elastomeric, seal defining O-ring 86.

The banana plug 72 is inserted into the bolt 74 through a washer 92. A sealing O-ring 94 may be provided in a notch between the body 76 and the washer 92.

The probe element 70 is centrally supported by the body 76 and the bolt 74 in the center of the conduit 36. The probe element 70 is generally cylindrical in shape and is preferably provided with an insulating sheath if the production fluid contains brine. In the preferred embodiment, an insulating sheath is provided by a heat shrunk plastic tube 96, which may comprise a plurality of layers such as an inner layer of polyolefin tubing with a meltable inner wall available as "SCL" from the Raychem Corp., and an outer layer of oil resistant plastic such as polyvinylidene fluoride tubing available as "Kynar" from the Raychem Corp. to prevent deterioration of the insulative sheath. Upon application of heat, the outer layer shrinks and the inner wall of the inner layer melts to fill any voids either in the probe element or in the outer wall of the inner layer. This tube 96 compressively engages the probe element 70, and extends over a substantial portion of the cylindrical probe end projections 98. Both of the projections 98 extend from an annular shoulder 100 on both ends of the probe element 70. The plastic tube 96 is tightly sealed by the plastic caps 99. The caps 99 threadably engage the external threads provided on the projections 98 and telescope over the ends of the plastic sheath to abut the shoulders 100 of the probe element. O-rings 101 are provided between the caps 99 and the corners formed by the shoulders 100 and the projections 99 to insure a fluid tight seal of the plastic tubing.

The internal surface of the conduit 36 functions as the outer electrode of the capacitor and is coated to prevent paraffin build-up with a protective coating 102 of a suitable plastic such as polyurethane. The conduit 36 may also be provided with a number of external annular grooves 104 for facilitating coupling into the fluid conduit.

Figure 7:
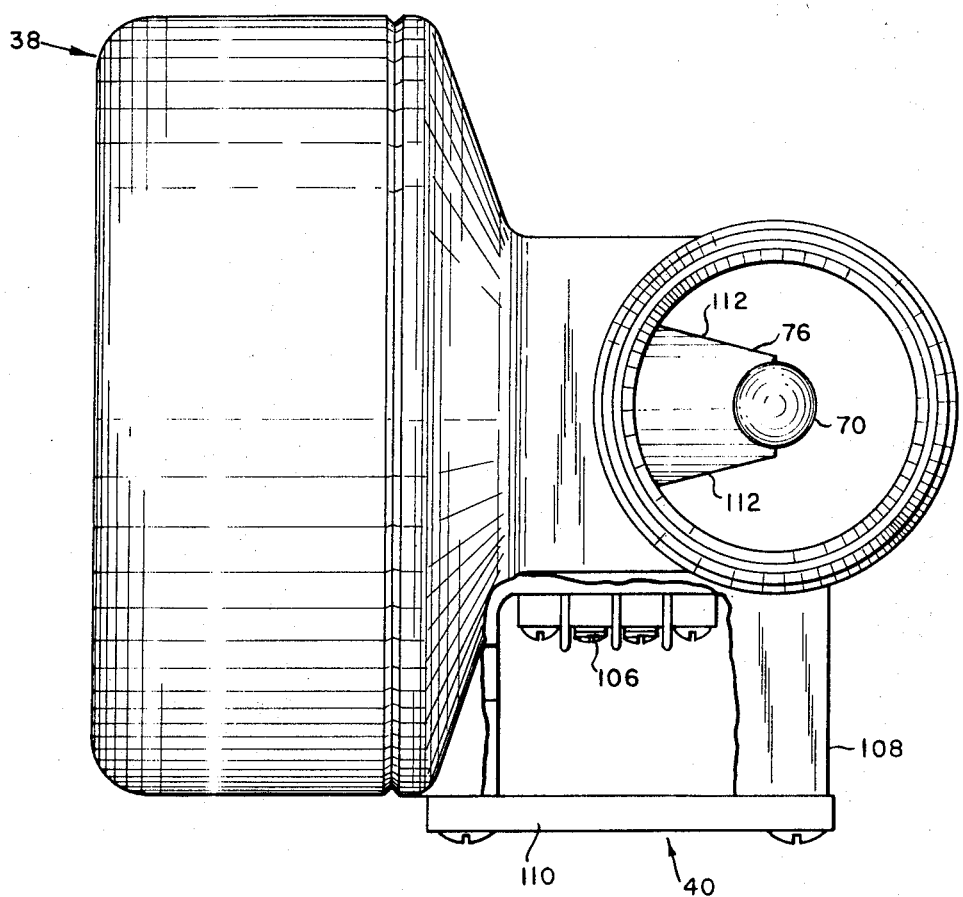
FIG. 7 is an end view of the preferred embodiment of the present invention.

Referring now to FIG. 7, electrical terminal panel 40 may include a number of connector terminals 106 disposed inside the projecting cylindrical wall 108 integrally formed as part of the body 35. The panel 40 may be electrically connected to the oscillator circuit 64 to provide input terminals for the application of power from an external source and output terminals from which the output signal of the oscillator 64 may be taken. A cover 110 may be removably attached to the cylindrical wall 108 to enclose the connector terminals 106, if desired.

The vertical sides 112 of the body 76 converge inwardly towards the probe element to reduce the obstruction to the flow of fluids as illustrated in FIG. 7.

Figure 8:
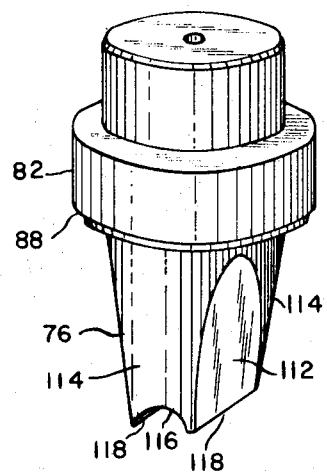
FIG. 8 is an enlarged perspective view of a preferred embodiment of the supporting body of insulating material which is part of the present invention.

As may be seen more clearly in FIG. 8, the vertical sides 112 are planar and substantially parallel to fluid flow. The sides 114 which face the direction from which fluid flows are rounded to further reduce the obstruction of fluid flow and to thus minimize the turbulence created. The body 76 is further provided with a concave, semicylindrical lower end surface 116 to form the spaced extensions 118. The probe element 70 is rigidly supported at axially spaced points on both sides of bolt 74 by the surface 116. This support prevents rotation of the probe element 70 in the plane of the drawing of FIG. 6. Furthermore, the extensions 118 rigidly engage the probe element 70 on both sides to prevent its rotation in the plane transverse to the plane of the drawing of FIG. 6.

OPERATION OF APPARATUS

In operation, the dielectric of the fluid flowing between the probe element 70 and the internal walls of the conduit 36 determine the capacitance of probe. The probe element 70 is electrically connected to the frequency determining part of a conventional oscillator circuit 64 through the body 35, the bolt 74 within the body 76, and the banana plugs 72 and 68. Specifically, the internal walls of the conduit 36 form one electrode of the probe which is connected to the oscillator circuit through the body 35 and banana plugs 68. The body 35 is preferably of ground potential. The probe element 70 which forms the other electrode is connected to the oscillator 64 through the bolt 76 and the banana plug 72. As the dielectric of the fluid flowing between the probe element 70 and the internal walls of the conduit 36 changes, the value of the capacitance changes, thereby varying the frequency of the output signal of the oscillator 64. A removable cover 56 is provided to enclose the oscillator housing 38 to allow easy access thereto, and the oscillator 64 is removably coupled to the body 35 to facilitate complete replacement or access to the probe element supporting structure.

METHOD OF ASSEMBLING THE CAPACITANCE PROBE

The capacitance probe of the present invention may be assembled in any convenient manner apparent from the disclosure of its preferred structure. One way in which this may be done is by the insertion of a bolt 74 in the body 76 and then placing the body 76 in the opening 46 to extend into the conduit 36. The probe element 70 may then be positioned within the conduit 36 between the extensions 118 of body 76 in alignment with the bolt 74. The bolt 74 may then be rotated to threadably secure the probe element 70 to it. Nut 78 may then be inserted into the opening 46 and rotated so that flange 82 is threadably advanced to tightly engage the shoulder 85 of the diameter portion 84.

PREFERRED STRUCTURAL DIMENSIONS OF THE CAPACITANCE PROBE

In accordance with the necessary response to interfaces, the probe element must be relatively short in length and is typically 6 inches. The conduit 36 generally varies in diameter from 1½ inches to 2 inches. The plastic caps and the body of rigid insulating material may be made of an acetal resin such as Du Pont's "Delrin."

SUMMARY OF PRINCIPAL ADVANTAGES AND SCOPE OF INVENTION

Thus, the present invention provides a capacitance probe having a probe element which is rigidly supported by a single support member in a manner which prevents deflection of the probe element in any direction. The problems associated with variable cable length connections to subsequent electrical circuitry are obviated. Moreover, the electrical connections between the probe element and such circuitry are isolated from the stresses applied to the probe element by the fluid flow. Additionally, impairment of accuracy due to the porosity of presently used probe element coatings is prevented by means of the improved insulative sheath provided on the probe element.

We claim:
1. A capacitance probe and variable frequency oscillator circuit assembly comprising:
 a body of electrically conductive material having a conduit serving as a fluid flow channel;
 said conduit having an aperture therein;
 an elongated probe element of electrically conductive material rigidly secured at a fixed central position within said conduit;
 an oscillator circuit support member mounted on one side of said body;
 an oscillator circuit mounted on said oscillator circuit support member;
 a terminal block mounted on said body and having electrical terminals connected to said oscillator circuit;

a first connector separable into two parts for providing an electrical connection between the electrical circuit on said support member and said body, one of said two parts of said first connector being fixedly connected to said oscillator circuit and the other of said two parts of said first connector being fixedly connected to said support member;

a second connector separable into two parts for providing an electrical connection between the oscillator circuit on said support member and said probe element, one of said parts of said second connector being fixedly connected to said oscillator circuit and the other of said two parts of said second connector extending through said aperture to engage said probe element; and a body of electrical insulation material surrounding said other of said two parts of said second connector and extending into said conduit, said body of electrical insulation material being tapered inwardly along the sides parallel to fluid flow and terminating in a semicylindrical slot in which said probe element is rigidly engaged and electrically isolated from said body of electrically conductive material.

2. A capacitance probe and variable frequency oscillator circuit assembly as claimed in claim 1 wherein said body and said oscillator circuit support member are formed as an integral body.

3. A capacitance probe comprising:
a body having a tubular member with an opening in one side thereof;
an elongated probe element disposed in a fixed position within said tubular member;
retaining means extending through said opening to retain said probe element in said fixed position;
said retaining means being electrically connected to said probe element; and
a body of rigid insulating material surrounding said retaining means and extending through said opening to rigidly engage said probe element at axially spaced points to rigidly support said probe element and prevent angular movement of said probe element in one plane, one of said points being on each side of said retaining means along the axis of fluid flow;
said body of rigid insulating material being tapered toward said probe element along the sides parallel to the longitudinal axis of said probe element and including spaced extensions at its probe engaging end to rigidly engage opposite sides of said probe element to further rigidly support said probe element and prevent angular movement of said probe element in a plane transverse to said one plane.

4. A capacitance probe as claimed in claim 3 wherein said body of rigid insulating material is tapered inwardly along the sides parallel to the longitudinal axis of said probe element from the point at which said body of rigid insulating material extends through said opening.

5. A capacitance probe as claimed in claim 3 wherein said spaced extensions extend parallel to the longitudinal axis of said probe element and wherein the end of said body of rigid insulating material between said spaced extensions is shaped complementarily to said probe element to form a groove for receiving said probe element.

6. A capacitance probe as claimed in claim 3 wherein the sides transverse to the longitudinal axis of said probe element are rounded to reduce obstruction to fluid flow.

7. A capacitance probe and electrical circuit assembly comprising
a body having a conduit section providing a fluid flow channel and having wall means defining a lateral opening extending transversely from said flow channel;
said walls means including a generally annular shoulder extending into said opening;

electrical circuit supporting means carried by said body adjacent to said opening in spaced relationship to said shoulder;
a probe element disposed in a fixed position in said flow channel;
an electrical circuit mounted on said circuit supporting means;
an electrical connector extending through said opening to connect said electrical circuit to said probe element;
a body of substantially rigid insulating material surrounding said electrical connector and extending through said opening to fixedly engage and stabilize said probe element;
said body of insulating material having an annular flange which engages said shoulder; and
means operable to urge said flange against said shoulder.

8. A capacitance probe and electrical circuit assembly as claimed in claim 7, wherein said body and said electrical circuit supporting means are integrally formed.

9. A capacitance probe comprising:
a conduit member having an aperture in one side thereof;
an elongated probe element;
retaining means extending through said aperture and securing said probe element at a fixed position within said conduit member;
annular shoulder means at both ends of said probe element and integral therewith;
a threaded projection axially extending from each of said shoulder means;
an insulating tube tightly covering said probe element and having projections extending onto said shoulder means and at least a portion of said threaded projections;
said insulating tube including:
an inner layer and an outer layer,
said outer layer being oil resistant to prevent deterioration of said insulating tube,
said inner layer being fused to fill any voids in said probe element or said outer layer;
caps formed of insulating material threadably secured to said projections and abutting said insulating tube compressively urging said insulating tube against said shoulders to thereby tightly seal said plastic tube.

10. A capacitance probe as claimed in claim 9 wherein said insulating tube comprises a thermally shrunk plastic tube compressively engaging said probe element.

11. A capacitance probe as claimed in claim 10 wherein said caps telescope over a portion of said outer layer and compressively urge said portion against said threaded projections.

12. A capacitance probe as set forth in claim 9 further comprising a plastic coating provided on said conduit member operable to prevent paraffin build-up thereon.

13. A system for determining the net oil in a fluid emulsion comprising:
separator means for separating the emulsion from free water and gas;
a first conduit for receiving said separated gas flow;
a second conduit for receiving said emulsion and said free water flow;
said second conduit having a vertically disposed section;
a flowmeter disposed in said second conduit to produce pulses related to the fluid flow therethrough;
a capacitance probe disposed in said vertically disposed section of said second conduit to produce an electrical signal having a frequency related to the dielectric constant of the fluid flow;
said capacitance probe including a fluid flow channel having an opening in one side thereof, an annular shoulder surrounding said opening, an oscillator circuit mounted on a support member adjacent to said opening, and a probe element disposed in a fixed position within said fluid flow channel;

said probe element being rigidly supported by insulating means extending through said opening and being connected to said oscillator circuit by electrical connector means extending through said opening;

said insulator means having a flange which engages said annular shoulder and a tapering end which terminates in a groove for receiving said probe element extending into said fluid flow channel to rigidly engage said probe element; and analyzing means for receiving said pulses from said flowmeter and said variable frequency signal from said capacitance probe to produce an indication of the net oil flow.

14. A system for determining the net oil in a fluid emulsion as claimed in claim 13 wherein said variable frequency signal is above 750 kHz. and responds to an interface between said emulsion and said free water in 0.22 second or less.

15. A capacitance probe comprising:
housing means;
circuit supporting means fixedly positioned within said housing means;
circuit means fixedly supported by said circuit supporting means;
capacitance probe means fixedly positioned within said housing meanns;
insulator means engaging and stabilizing said probe means;
said insulator means including a flange and a tapering end terminating in a probe means receiving seat to rigidly engage said probe means;

insulator supporting means spaced from said circuit supporting means and fixedly positioned within said housing means;

said insulator supporting means including a shoulder which engages said flange;

said insulator means being fixedly supported by said insulator supporting means by means operable to urge said flange against said shoulder;

a first telescopable electrical connector interposed between said circuit supporting means and said insulator supporting means and electrically interconnecting said circuit means and said probe means; and a second telescopable electrical connector interposed between said circuit supporting means and said circuit means and electrically interconnecting said circuit means and said housing means.

References Cited

UNITED STATES PATENTS

| | | | |
|---|---|---|---|
| 2,720,624 | 10/1955 | Gunst et al. | 324—61 |
| 2,737,469 | 3/1956 | Anderson et al. | 324—61 X |
| 2,931,433 | 4/1960 | Mertz | 324—61 X |
| 3,005,554 | 10/1961 | Kuntz | 324—61 X |
| 3,078,709 | 2/1963 | Clark | 73—53 |
| 3,142,985 | 8/1964 | Seaver | 73—233 |
| 3,200,312 | 8/1965 | Callahan | 317—246 |
| 3,269,180 | 8/1966 | Schreiber | 324—61 X |
| 3,368,147 | 2/1968 | Graham | 324—61 |

EDWARD E. KUBASIEWICZ, Primary Examiner

U.S. Cl. X.R.

317—246